United States Patent [19]

Geffroy

[11] 4,103,594
[45] Aug. 1, 1978

[54] PISTON AND SCRAPER RING ASSEMBLY

[76] Inventor: Robert Geffroy, 1, Boulevard Richard Wallace, 92200 Neuilly-sur-Seine, France

[21] Appl. No.: 480,191

[22] Filed: Jun. 17, 1974

[30] Foreign Application Priority Data

Jun. 26, 1973 [FR] France .................... 73 23318

[51] Int. Cl.² .................... F01M 11/02; F16J 1/08
[52] U.S. Cl. .................... 92/159; 92/160; 277/79; 277/168; 277/170
[58] Field of Search .................... 92/159, 160, 158; 277/168, 169, 170, 171, 172, 71, 79, 214, 215, 78, 173

[56] References Cited

U.S. PATENT DOCUMENTS

| 1,333,023 | 3/1920 | Johnston | 277/170 |
| 1,462,501 | 7/1923 | Barnwald | 92/158 |
| 1,534,198 | 4/1925 | Wilson | 277/170 |
| 1,605,040 | 11/1926 | Kreis | 92/160 |
| 1,737,658 | 12/1929 | Howe | 92/160 |
| 1,740,812 | 12/1929 | Farmer | 277/170 |
| 2,834,643 | 5/1958 | Hutto | 277/168 X |
| 2,951,732 | 9/1960 | Brenneke | 277/79 |
| 3,396,976 | 8/1968 | Reinhoudt et al. | 277/173 |
| 3,733,973 | 5/1973 | Elsbett et al. | 92/159 |

FOREIGN PATENT DOCUMENTS

| 833,293 | 7/1938 | France | 277/168 |
| 944,761 | 6/1956 | Fed. Rep. of Germany | 277/170 |

Primary Examiner—Irwin C. Cohen

[57] ABSTRACT

A piston is formed with a peripheral groove for receiving a scraper ring, and an annular, axially extending recess is formed in the face of the scraper ring groove on the side thereof toward the piston crown and adjacent the piston wall, with the recess terminating in an oil-recovery lip at the piston wall and spaced from the adjacent oil-scraping edge of a scraper ring mounted in the groove. The annular recess acts as a reservoir for oil scraped from the wall of a cylinder in which the assembly is reciprocated, which oil is subject to a force attracting it toward the crown of the piston and permits the oil from the reservoir to flow between those adjacent surfaces of the ring and groove closer to the piston crown and out through an outlet from the groove.

13 Claims, 2 Drawing Figures

PISTON AND SCRAPER RING ASSEMBLY

BACKGROUND OF THE INVENTION

1. Field of the Invention

This invention relates to piston and oil scraper ring assemblies of the type employed in engines, compressors and other machines, and more particularly to an improved piston and scraper ring assembly having means for providing more efficient and complete return of oil from a cylinder wall to the oil sump.

2. Description of the Prior Art

The pistons movable in cylinders in internal combustion engines, compressors and other machines (hereinafter referred to generally as engines) are generally equipped with a scraper ring mounted in a groove in the piston and intended primarily to restrict the passage of oil between the crank case and the working chamber of the piston. During every piston stroke, the ring scrapes the oil off the walls of the cylinder and recycles it to the crankcase by way of the gap between those mutually adjoining ring and groove surfaces which are leading during that stroke of the piston, and then by way of orifices, generally in the bottom of the groove, leading to the crank case via the interior of the piston.

During each stroke this oil recycling circuit is open due to the pressure of the piston on the ring until the time during the second half of the stroke when inertia forces arising from deceleration of the piston throw the ring on to that side of its groove which is leading at the time. This interrupts the oil recovery circuit for the remainder of that stroke, and at each dead center the ring accumulates, against its leading side and against the cylinder, a band or film of scraped oil which escapes from the recycling circuit. The band of oil deposited at the top dead center has a considerable effect on the oil consumption of an engine, and the present invention is concerned with recovering at least some of this band of oil at the top dead center position.

SUMMARY OF THE INVENTION

According to this invention there is provided a piston having at least one peripheral groove containing a scraper ring, and having a recess in the piston in a position adjoining that scraper lip of the ring which is nearer the crown of the piston, the recess being such as to constitute a reservoir without outlet for a liquid subjected to a force attracting it towards the crown of the piston, to cooperate with the said scraper lip on the ring and with an oil recovery lip formed at the circumferential face of the piston and bounding one side of the recess, which oil recovery lip is disclosed close to the said scraper lip, and to communicate, by way of a passage between those adjacent sides of the ring and groove which are closer to the crown of the piston, with an outlet from the groove.

BRIEF DESCRIPTION OF THE DRAWINGS

These features of the invention will be apparent from the following description of two embodiments of the invention, given by way of example and illustrated in the accompanying drawings in which.

DESCRIPTION OF THE PREFERRED EMBODIMENTS

Figure 1:
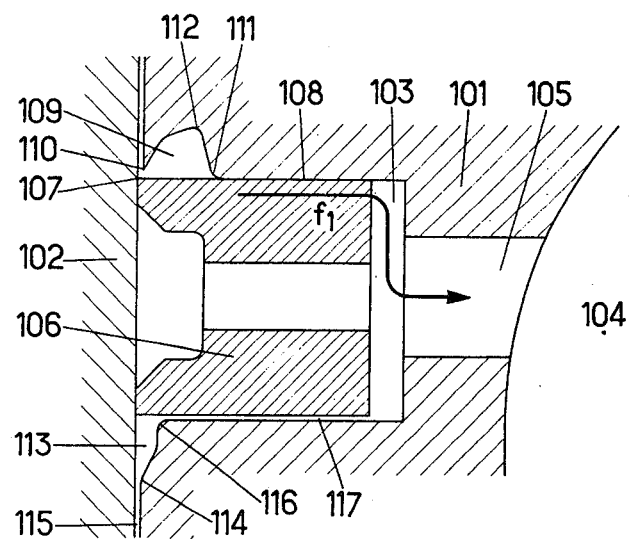
FIG. 1 represents a fragmentary axial section through a first embodiment.

FIG. 1 shows a piston 101 movable in a cylinder 102 and containing a scraper-ring groove 103, which communicates with the crank case by way of holes 105 and the hollow interior 104 of the piston 101. The scraper ring 106 may be conventional, but preferably has a sharp-edged scraper lip 107 at its upper side or the side nearer the piston crown. At the radial outer edge portion of the upper side 108 of groove 103, the piston has a recess in the form of an annular channel 109 with a downwardly directed circumferential lip 110, which preferably has a sharp edge close to the scraper lip 107 and the wall of cylinder 102. This channel 109 is joined to the upper side of the groove by a rounded portion 111. The recess 109 preferably has its deepest portion 112 furthest from the cylinder.

Between its groove 103 and the crankcase, the piston has a second peripheral recess 113 connected to the piston skirt by a transition portion or profile 114 which promotes dynamic entraining of the oil from the recess 113 into the gap 115 between the piston and cylinder walls during strokes in the direction of top dead center. The recess 113 is connected to the crankcase side of the groove by a rounded portion 116.

Figure 2:
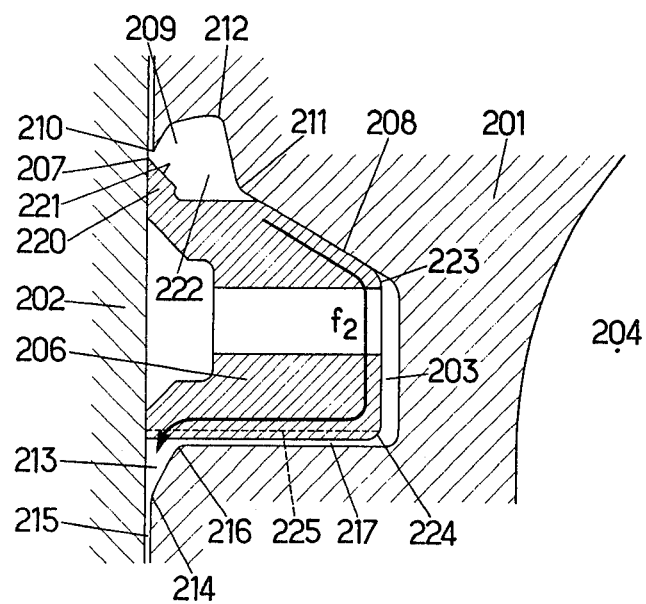
FIG. 2 is a corresponding view of another embodiment.

FIG. 2 illustrates, in a manner similar to the first embodiment, a piston 201 movable in a cylinder 202 and containing a groove 203 for a scraper ring 206. The piston 201 is provided with a recess in the form of an annular channel 209 similar to the channel 109, and a circumferential lip 210 similar to the circumferential lip 110.

This assembly has various additional features, which may be used separately or together, as follows:

The scraper ring 206 has, at its side remote from the crankcase, a lower lip 220 with a frusto-conical sloping surface 221 which guides the oil scraped during the upward strokes of the piston towards the piston axis and away from the piston crown into a zone 222 open to the recess 209, where the oil is not in contact with the cylinder;

The inner diameter of the frusto-conical surface 221 is smaller than the diameter of the oil recovery lip 210 on the piston;

The circumferential lip 210 is close to the scraper lip 207 and cylinder 202;

The adjacent portions 208 of the upper sides of the groove and ring are parallel and frusto-conically inclined towards the piston axis in a direction away from the crown of the piston;

Radiused portions 211, 223, 224 and 216 are provided on the piston 201 and ring 206 to promote the passage of fluid along the drainage circuit formed between the recess 209 and the gap 215 between cylinder and piston skirt;

A recess 213 and a profile 214 connecting it to the gap 215 between cylinder and piston are similar to features 113 to 115 in FIG. 1; and The groove 203 does not have orifices connecting it to the interior of the piston 204, but a permanent connection between the bottom of the groove 203 and the crankcase is ensured, in this embodiment, by radial slots or orifices 225, which are shown in the ring 206, but which could equally well be in the lower side of the piston groove.

The embodiment shown in FIG. 1 operates as follows.

During the first half of each rising stroke of the piston (i.e., the stroke from bottom dead center to top dead center) the scraper ring 106 is pressed against the crankcase side of its groove, due to friction of the ring against the cylinder and due to inertia. From the half-way point the inertia is reversed, and when it is great enough to overcome the friction it presses the scraper ring 106 against the upper surface 108 of its groove. During the first part of this stroke, therefore, the adjacent sides 117 of the groove and ring are in contact, and there is clearance between the adjacent portions 108 of the groove and ring. The oil scraped off the cylinder 102 by the lip 107 on the ring 106 passes through the clearance at 108 and returns to the crankcase as indicated by an arrow f1.

During the second part of the piston stroke this flow route is closed due to contact between the surfaces 108 as shown in FIG. 1, and until the top dead center is reached the upper lip of the scraper ring 107 scrapes the oil along the cylinder, so than an annular pool or band of oil forms in contact with the upper side of the scraper ring and with the cylinder. During the next stroke of the piston, which is downward from top dead center to bottom dead center, the oil band so deposited is at least partly recovered by the lip 110 on the piston and is urged by its own inertia into the deepest portion 112 of the circular recess 109. This band of oil, therefore, does not remain on the cylinder and is not, as heretofore, collected by the compression ring or rings situated between the scraper ring and the combustion chamber.

Half-way through this downward stroke, the inertia is again reversed. Immediately the oil previously urged into the deepest part 112 of the recess 109 is projected on to the upper side of the scraper ring, and then, when the inertia overcomes the friction between the ring and cylinder, the ring 106 in turn is thrown on to the lower side of its groove, opening the passage at 108 so that the oil can again flow out to the crankcase as indicated by the arrow f1.

The ring 206 shown in FIG. 2 operates in the same way as that shown in FIG. 1, but its efficiency is increased by the special features described above. Thus, the lip 220, with its sloping surface 221, reduces the tendency of the band of oil to collect in contact with the cylinder, but rather any oil which is collected is directed efficiently into the recess 209. Also, the inclination of the adjacent ring and groove sides 208 accelerates, by means of inertia, the movement of the oil projected on to the upper side of the ring 208 towards the bottom of the groove 203.

During the first part of the upward strokes, the dynamic suction effect due to friction in the gap 215 is accentuated in the chamber 213 by the piston profile at 214, and the suction is transmitted positively to the recess 209. This suction accelerates the passage to the crankcase of the oil scraped off by the lip 220 along the path indicated by the arrow f2.

The rounded portions 211, 223, 224 and 216 further promote the flow of oil indicated by the arrow f2.

During each stroke, therefore, the illustrated pistons recover some or all of the band of oil formed above the scraper ring during the latter part of the upward piston strokes, and then retains the oil in the piston during the downward strokes until the inertia is reversed, when the oil is returned to the crankcase. This is an important contribution to limiting the oil consumption of the engine or other machine.

If the pistons prove too efficient, to the point of interferring with the lubrication of the top of the piston, oil consumption can be adjusted to the optimum level by omitting or modifying certain of the improvements mentioned, for example by providing a curved portion or chamfer instead of the sharp edge on the scraper lip 107 or 207 of the scraper ring or on the collecting lip 110 or 210 on the piston.

While I have disclosed and described preferred embodiments of my invention, I wish it understood that I do not intend to be restricted solely thereto, but rather that I intend to include all embodiments which would be apparent for one skilled in the art and which come within the spirit and scope of my invention.

What is claimed is:

1. A crowned reciprocating engine piston having at least one peripheral groove containing a scraper ring dimensioned with relative clearance permitting axial shifting of said ring within said groove and said ring having peripheral scraping lips thereon, one of which is relatively nearer the piston crown, a recess in said piston in a position adjoining said one scraper lip, said recess defining a reservoir extending closer to said piston crown than any outlet for oil collected therein, an oil recovery lip formed at the circumferential face of the piston and bounding one side of the recess and disposed in closely spaced relation to said one scraper lip, said reservoir being adapted to cooperate with said one scraper lip and said oil recovery lip to collect oil from a cylinder wall during a limited portion of said piston's reciprocating cycle, and with a clearance open during a different limited portion of said cycle between those adjacent sides of said ring and said groove which are closer to the crown of the piston providing communication for the collected oil from said recess to said groove, and an outlet from the groove.

2. A piston as claimed in claim 1, wherein the recess is in the form of an annular channel.

3. A piston as claimed in claim 2, wherein the deepest portion of the annular channel is that portion which is furthest from the circumferential face of the piston.

4. A piston as claimed in claim 1, wherein the edge of said recess adjoining said passage is radiused.

5. A piston as claimed in claim 1, wherein the said scraper lip of the scraper ring comprises a lip of which the face further from the crown of the piston is frustoconical, being inclined so as to extend towards the piston axis and away from the crown of the piston.

6. A piston as claimed in claim 5, wherein the inner diameter of said frusto-conical face is smaller than the diameter of said oil recovery lip on the piston.

7. An assembly as claimed in claim 1, wherein the adjacent portion of the sides of said ring and groove nearer the crown of the piston are formed with substantially parallel slopes directed towards the piston axis below the plane of the upper sides of the ring and groove.

8. A piston as claimed in claim 1, wherein said outlet from said groove comprises channel means providing communication with the external surface of the piston skirt, said channel means including permanently open ducts formed between the lower adjacent sides of the ring and groove.

9. A piston as claimed in claim 1 further comprising a second recess formed in said portion of the skirt thereof immediately below said groove, said second recess providing a second reservoir for accumulating oil scraped off by the lower lip of said scraper ring.

10. A piston as claimed in claim 9 further comprising an involute wall profile portion joining the surface defining said second recess to the external surface of the piston skirt, said involute wall profile portion being adapted to promote dynamic entraining of the oil.

11. A piston as claimed in claim 10, wherein the axially inner edges of said scraper ring and the radially outer edge of the lower side of the piston groove are radiused.

12. A crowned piston having therein at least one peripheral groove containing a scraper ring formed with scraper lips, an oil outlet from said groove, a peripheral recess which is formed in the side wall of said groove extending to provide an oil reservoir nearer the crown of the piston than any outlet for oil collected therein when subjected to a force tending to cause relative movement of the oil towards the crown of said piston, said recess being bounded at its radially outer edge by an oil recovery lip formed on the piston close to the scraper lip nearer the crown of the piston, the arrangement being such, including side wall clearance between said ring and groove that when the oil and scraper ring are subjected to a force causing relative movement thereof away from the crown of the piston, a passage between said side wall of the groove and the adjacent face of the scraper ring opens to the recess and enables the oil to escape from the recess and from the groove to said outlet.

13. A piston as claimed in claim 1 wherein said one scraper lip and said adjacent sides of said ring and said groove are frusto-conical, being inclined so as to extend towards the piston axis and away from the crown of the piston.

* * * * *